Patented Oct. 26, 1948

2,452,187

UNITED STATES PATENT OFFICE 2,452,187

SYNTHESIS OF NITRILES

William F. Gresham, Wilmington, Del., assignor to E. I. du Pont de Nemours & Company, Wilmington, Del., a corporation of Delaware No Drawing. Original application February 21, 1946, Serial No. 649,381. Divided and this application February 24, 1948, Serial No. 10,572

4 Claims. (Cl. 260—465.1)

This invention relates to the synthesis of nitriles, and more particularly to the synthesis of nitriles from aldehydes and ammonia in the presence of specific catalysts. The process of the invention may be illustrated in a specific embodiment by means of the following equation:

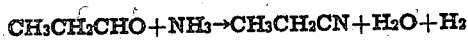

$$CH_3CH_2CHO + NH_3 \xrightarrow{\text{Co or Cu-Zn catalyst}} CH_3CH_2CN + H_2O + H_2$$

It has been known heretofore that certain aliphatic and aromatic nitriles can be prepared by reaction between ammonia and aldehydes at elevated temperatures in the presence of catalysts such as thorium oxide. These prior art processes, however, invariably gave low yields of the desired nitriles, and accordingly they have not been commercially successful, even though the reactants are relatively inexpensive and the nitriles themselves are highly valuable as chemical intermediates.

An object of this invention is to provide a process whereby nitriles can be obtained from aldehydes and ammonia in high yields. A more specific object of the invention is to provide an improved and commercially feasible process for the manufacture of propionitrile. Other objects of the invention will appear hereinafter.

These objects are accomplished in accordance with the invention by reacting an aldehyde of the formula $R(CHO)_n$ (R being a hydrocarbon radical containing from 1 to 8 carbon atoms, preferably 2 to 8 carbon atoms; $n$ being an integer from 1 to 2 inclusive) with ammonia in the presence of a metallic catalyst containing as an essential constituent a member of the class consisting of cobalt and copper, preferably as more specifically hereinafter illustrated. Although combinations of copper, manganese and of copper and magnesium gave good results in carrying out the invention, preferably the synthesis of nitriles is accomplished in accordance with the invention in the presence of a specific type of metallic catalyst, namely a catalyst containing both copper and zinc.

The process of the invention may be carried out at temperatures of about 275° to 500° C., preferably about 300° to 350° C. The pressure may be varied rather widely, but atmospheric pressure is generally preferred. Subatmospheric pressures may also be employed but they are generally not necessary.

The invention may be practiced by passing a mixture of the aldehyde and ammonia over grains of the catalyst at the aforesaid temperatures and pressures, and thereafter separating the nitrile from the resultant reaction product. One convenient method for separating the said nitrile is to cool the reaction products by means of a water-cooled condenser and to distill the resulting condensate.

In certain instances the reaction product obtained in accordance with the invention contains in addition to the nitriles certain pyridine derivatives, the formation of which may be suppressed through the use of specific catalysts, such as metallic cobalt or catalysts containing copper and zinc in combination. By way of contrast, in the reaction between propionaldehyde and ammonia in the presence of alumina catalysts in the absence of these metals, virtually no propionitrile is produced, and appreciable quantities of 2-ethyl-3,5-dimethyl pyridine are generally obtained; similarly, in the preparation of acetonitrile from acetaldehyde and ammonia, appreciable quantities of alpha-picoline are thus frequently obtained. One of the advantages of using the preferred catalysts is that the formation of these by-products can be prevented or suppressed thereby.

The catalysts employed in the practice of the invention are preferably prepared by at least partially reducing the metal oxides with hydrogen or a hydrogen donor such as methanol, care being taken to avoid excessive overheating during the said reduction. The method of reducing the catalyst is, in fact, highly critical; i. e., for optimum results, it is necessary to exercise careful control over the heat evolved and other variables. For example, with Cu-Zn catalysts, this can be accomplished conveniently by reducing the catalyst with aqueous methanol at a temperature of 330° to 350° C.

The term "metallic" as employed herein signifies not only the metals themselves, but metals in the form of their oxides or in other similar, metalliferous, reducible forms. Expressions such as Cu-Zn mean catalysts in which the several named ingredients (in this instance copper and zinc) are present in "metallic" form. Cu-Zn or Co catalysts, may, of course, contain in addition to the named metallic ingredients, various relatively inert materials, but such materials are generally neither necessary nor desirable.

The mol ratio of ammonia:aldehyde initially introduced into the reaction vessel in accordance with the invention may vary widely, but is generally within the range of about 1:1 to 10:1. If desired the reaction mixture may also contain water or inert gases such as nitrogen, and the like, but, with the preferred catalysts high yields are obtainable without using inert diluents.

The aldehydes which may be employed in the practice of the invention include the lower aliphatic aldehydes, such as acetaldehyde, propionaldehyde, isobutyraldehyde, adipic dialdehyde, etc.; unsaturated aldehydes, such as acrolein and methacrylaldehyde; and aromatic and naphthenic aldehydes such as benzaldehyde, toluic aldehyde, cyclohexylacetaldehyde, and the like. The invention is especially valuable when employed in the manufacture of propionitrile from propionaldehyde and ammonia, or isobutyronitrile from isobutyraldehyde and ammonia.

The invention may be illustrated further by means of the following examples. It is to be understood that the method of Example 1 is equally applicable in preparing other nitriles, particularly isobutyronitrile and benzonitrile.

*Example 1.*—A copper-zinc catalyst of the formula 1Cu:2Zn was prepared by reducing the ignited coprecipitated oxalates (carbonates give similar results) at 330° to 350° C., with 2% aqueous methanol until the analysis of the off gas indicated that the only reactions occurring were the pyrolysis of methanol and the reaction $CO + H_2O \rightarrow CO_2 + H_2$. A mixture of propionaldehyde (space velocity, 197) and ammonia (space velocity, 800) was passed over the reduced catalyst at a temperature of 300° to 330° C. After leaving the catalyst, the gases passed through a water-cooled condenser, and the resulting liquid condensate, which was a mixture of water, nitrile, ammonia, and small quantities of by-product amine, was dried. This was accomplished by extracting with chloroform and adding potassium carbonate to the chloroform layer. The resulting chloroform solution of non-aqueous reaction products was filtered and distilled, yielding a fraction boiling at 95° to 97° C., which was relatively pure propionitrile. Another propionitrile cut, which had a boiling point of 59° at 200 mm., was also obtained. The conversion of propionaldehyde to propionitrile was 77% of the theoretical, taking into account further quantities of propionitrile isolated by redrying and redistilling the foreshot cuts obtained in the initial distillation.

*Example 2.*—Example 1 was repeated under substantially similar conditions, using, in place of the Cu:Zn catalyst, the catalysts listed in the following table.

*Conversion of propionaldehyde and ammonia to propionitrile*

| Run No. | Catalyst | Conversion to Propionitrile |
|---|---|---|
| | | Percent |
| 1 | Cu-Zn-Cr-K | 44 |
| 2 | Cu-Zn-Cr | 41 |
| 3 | Cu-Cr-Zn-SiO$_2$ | 31.6 |
| 4 | Co | 46.3 |
| 5 | Co-Cr | 13.5 |
| 6 | Cu-Mn-K | 30.3 |
| 7 | Cu-Mg | 33 |
| 8 | Cu-Ag-Al$_2$O$_3$ | 4.7 |
| 9 | Cu-Cr-Mg | 7.5 |

In each of the above tests a substantial quantity of propionitrile was obtained, but in no instance was the conversion as high as had been obtained as disclosed in Example 1 with a Cu-Zn catalyst. In most of these tests one of the chief by-products was 2-ethyl-3,5-dimethyl pyridine.

It is to be understood that the above examples are illustrative only and that they do not necessarily limit the invention. Numerous modifications of the invention will occur to those skilled in the art. For example, catalysts in a finely divided particulate state, suitable for use in "fluid catalyst" techniques, may be employed if desired. Any convenient method may be used for separating the nitrile from the reaction products.

The nitriles obtained in accordance with the present invention are widely useful per se, and are especially valuable for example, in the manufacture of acrylonitrile and methacrylonitrile, which are obtainable in high yield by passing the appropriate saturated nitriles (propionitrile and isobutyronitrile) over conventional dehydrogenation catalysts at elevated temperatures.

This application is a division of my copending application S. N. 649,381, which was filed on February 21, 1946, now Patent No. 2,443,420, patented June 15, 1948.

Since many different embodiments of the invention may be made without departing from the spirit and scope thereof, it is to be understood that I do not limit myself except as set forth in the following claims.

I claim:

1. A process for preparing nitriles of the formula $R(CN)n$, R being a hydrocarbon radical having from 1 to 8 carbon atoms, $n$ being an integer from 1 to 2 inclusive, which comprises reacting ammonia with an aldehyde of the formula $R(CHO)n$ in the presence of a metallic cobalt catalyst at a temperature of about 275° to 500° C. and thereafter separating from the resultant reaction product the nitrile of the formula $R(CN)n$ produced by the said reaction.

2. A process for preparing nitriles of the formula $R(CN)n$, R being a hydrocarbon radical having from 1 to 8 carbon atoms, $n$ being an integer from 1 to 2 inclusive, which comprises reacting ammonia with an aldehyde of the formula $R(CHO)n$ in the presence of a metallic cobalt catalyst at a temperature of about 300° to 350° C. and thereafter separating from the resultant reaction product the nitrile of the formula $R(CN)n$ produced by the said reaction.

3. A process for preparing nitriles of the formula RCN, R being a hydrocarbon radical having from 2 to 8 carbon atoms, which comprises reacting ammonia with an aldehyde of the formula RCHO in the presence of a metallic cobalt catalyst at a temperature of about 275° to 500° C. and thereafter separating from the resultant reaction product the nitrile of the formula RCN produced by the said reaction.

4. The process of claim 3 in which the said aldehyde is propionaldehyde and the said nitrile is propionitrile.

WILLIAM F. GRESHAM.

REFERENCES CITED

The following references are of record in the file of this patent:

UNITED STATES PATENTS

| Number | Name | Date |
|---|---|---|
| 2,404,280 | Dutcher | July 16, 1946 |
| 2,412,437 | Wagner | Dec. 10, 1946 |

FOREIGN PATENTS

| Number | Country | Date |
|---|---|---|
| 334,193 | Great Britain | Aug. 25, 1930 |

OTHER REFERENCES

Mailhe et al., Comp. rend. (Fr. Acad.), vol. 165, p. 557 (1917).

Mailhe et al., Bull. soc. chim. (4), vol. 23, pp. 18, 238 (1918).

Mailhe et al., Ann. chim., vol. 13, p. 216 (1919).

Mailhe et al., Bull. soc. chim. (4), vol. 25, p. 588 (1919).

Mailhe et al., Bull. soc. chim. (4), vol. 27, p. 229 (1920).